(12) United States Patent
Schalmath

(10) Patent No.: US 6,343,907 B1
(45) Date of Patent: Feb. 5, 2002

(54) LOW-LIFT FORK TRUCK

(75) Inventor: Heinz Schalmath, Stuvenborn (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/621,714

(22) Filed: Jul. 24, 2000

(30) Foreign Application Priority Data

Jul. 26, 1999 (DE) .......................... 199 35 008

(51) Int. Cl.⁷ .......................... B66F 19/00; B62D 51/04
(52) U.S. Cl. .................. 414/495; 180/13; 180/19.2; 280/43.12
(58) Field of Search ............ 414/495; 280/43.12; 180/13, 19.2

(56) References Cited

U.S. PATENT DOCUMENTS

| | | | | |
|---|---|---|---|---|
| 3,036,651 A | * | 5/1962 | Paul et al. ............ | 280/43.12 X |
| 3,183,989 A | * | 5/1965 | Trusock et al. ....... | 280/43.12 X |
| 3,202,233 A | * | 8/1965 | Dolphin et al. ....... | 280/43.12 X |
| 3,612,564 A | * | 10/1971 | Harvey .................. | 280/43.12 |
| 3,701,211 A | * | 10/1972 | Best ...................... | 280/43.12 |

FOREIGN PATENT DOCUMENTS

| | | | | |
|---|---|---|---|---|
| DE | 2348408 | * | 4/1974 | ............. 280/43.12 |
| GB | 814917 | * | 6/1959 | ................. 414/495 |

* cited by examiner

Primary Examiner—Steven A. Bratlie
(74) Attorney, Agent, or Firm—Vidas, Arrett & Steinkraus, P.A.

(57) ABSTRACT

A low-lift fork truck including a driving part which has a driving wheel disposed on the longitudinal axle and is driven by an electric motor, which is supported in a steering bolster adapted to be pivoted about a vertical axis, and a drawbar hinged to the steering bolster and a lifting cylinder. The truck further including a load-carrying part adjustable in height to a certain extent towards the driving part which has two parallel-spaced wheel arms and a rigid transverse member interconnecting the wheel arms wherein the transverse member is adapted to be coupled to the lifting cylinder and a linkage coupled to the transverse member is joined by a hinge to a forcing bar in the wheel arms which, in turn, actuates the rocker of a load-carrying roller at the end of the wheels arms to perform a lift. The lifting cylinder is disposed in a position approximately centric to the pivoting axis of the steering bolster, a rigid load-carrying part carrier firmly connected to the transverse member is hinged to the upper adjustable end of the lifting cylinder, and the transverse element of the load-carrying part is hinged to the frame of the driving part via two parallel levers disposed below the lifting cylinder for guidance of the load-carrying part and actuation of the forcing bars.

4 Claims, 2 Drawing Sheets

LOW-LIFT FORK TRUCK

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a low-lift fork truck.

Low-lift fork trucks having an electric motor drive have become known in very different embodiments. They generally are composed of a load-carrying part which is held on a driving part so as to be adjustable in height to a limited extent. The driving part has a driving wheel centrally disposed on the longitudinal axle, which mostly is driven by a wheel hub drive. The driving wheel is supported in a steering bolster which, in turn, is pivotally supported about a vertical axis. The steering bolster is engaged by a drawbar the head of which contains actuating elements for the control of the drive and a lifting device which usually comprises a lifting cylinder which is coupled to the load-carrying part via appropriate means. The load-carrying part is composed of two parallel-spaced wheel arms which are interconnected via a rigid transverse member. Each of the wheel arms carries a forcing bar which, towards the free end, is coupled to a rocker which supports a load-carrying roller. At the drive end, the forcing bar is coupled to a linkage which when the lifting cylinder is operated is actuated, in turn, to displace the forcing bar and to move out or retract the load-carrying roller.

It is the object of the invention to improve such a low-lift fork truck in a way that the driving part may be designed to be smaller and more compact.

BRIEF SUMMARY OF THE INVENTION

In the inventive low-lift fork truck, the lifting cylinder is disposed centrically to the pivotable axis of the steering bolster with the load-carrying part carrier, as a rigid member, connected by a hinge to the upper end of the lifting cylinder. Provided in the lower area of the driving part are two parallel levers which are hinged to the frame of the driving part at one end and to the load-carrying part carrier at the other. This gives the load-carrying part a guide in lifting or lowering the lifting cylinder. Although the hinge point of the levers on the transverse member describes an arc during a lift whereby a slight tilt of the load-carrying part occurs this motion is negligible, particularly when the hinge points of the levers, on the transverse element, are in a plane which is approximately vertical in the lifted and lowered positions. According to an aspect of the invention, the hinge point of the levers on the driving part preferably is in a plane which extends through the axis of the lifting cylinder and, hence, the pivoting axis of the steering bolster.

The centric disposition of the lifting cylinder has the exceptional advantage that only low flexural moments occur because the transmission of forces to the load-carrying part substantially takes place in the axis of the lifting cylinder. Therefore, the lifting cylinder may be designed to be relatively small. The arrangement of the lifting cylinder, in turn, results in a compact way of construction of the driving part.

According to an aspect of the invention, the load-carrying part carrier is defined by an approximately U-shaped bow the legs of which are rigidly connected to the transverse member and the web of which is hinged to the lifting cylinder via two parallel plates. This makes it possible to improve the transmission of forces by the fact that braces which are laterally connected to the transverse member laterally engage the legs of the bow.

Another aspect of the invention provides that the lifting cylinder, by means of its piston rod, bears onto the steering bolster and the load-carrying part carrier is hinged to the cylinder jacket and that a motor-driven pump unit is firmly connected to the cylinder jacket. In this embodiment, flexible-tube connections which, in addition, are continuously moved while the lifting cylinder is actuated, may be omitted. A unit comprising a motor pump and a tank, which is disposed in a single casing, may be provided which is connected to the jacket of the lifting cylinder in an appropriate way. Also, a very small tank may be provided where a change of the hydraulic oil is normally unnecessary. According to an aspect of the invention, the cylinder jacket and the casing for the motor-driven pump unit may also be formed integrally.

In the embodiment mentioned last, the piston rod bears onto the steering bolster and, therefore, will be turned along when the steering bolster is pivoted. It is quite imaginable to provide an appropriate bearing to prevent the piston rod from rotating. However, the rotation of the piston rod does not pose a problem, particularly if the lifting cylinder has adequately been designed for this purpose.

BRIEF DESCRIPTION OF THE SEVERAL VIEWS OF THE DRAWINGS

The invention will now be described in greater detail with reference to the drawings.

DETAILED DESCRIPTION OF THE INVENTION

Figure 1:
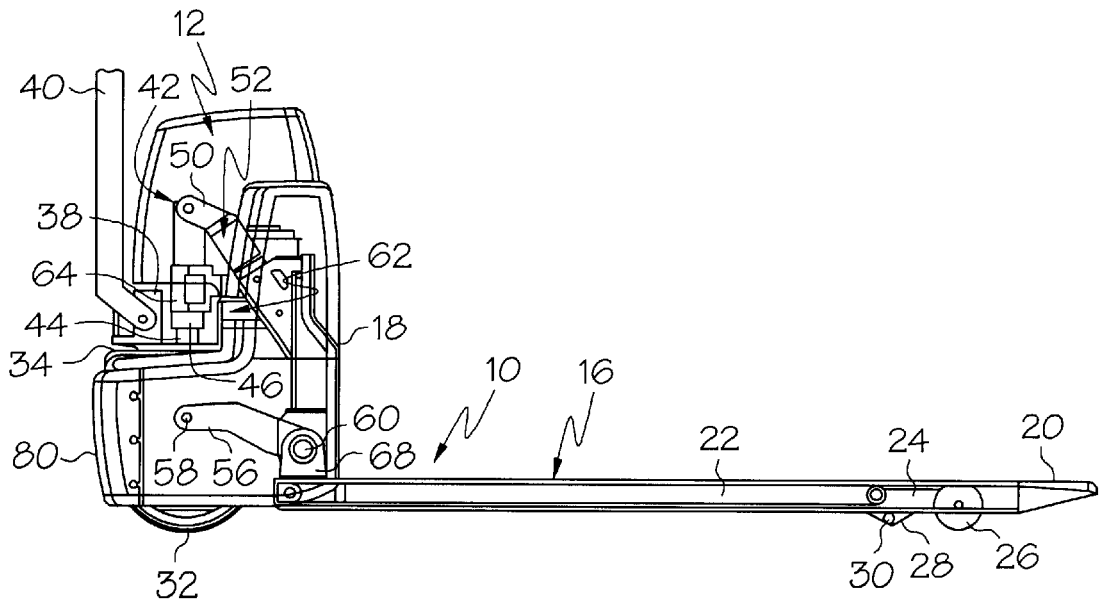
FIG. 1 shows a low-lift fork truck according to the invention in the lowered position of the load-carrying part.
Figure 2:
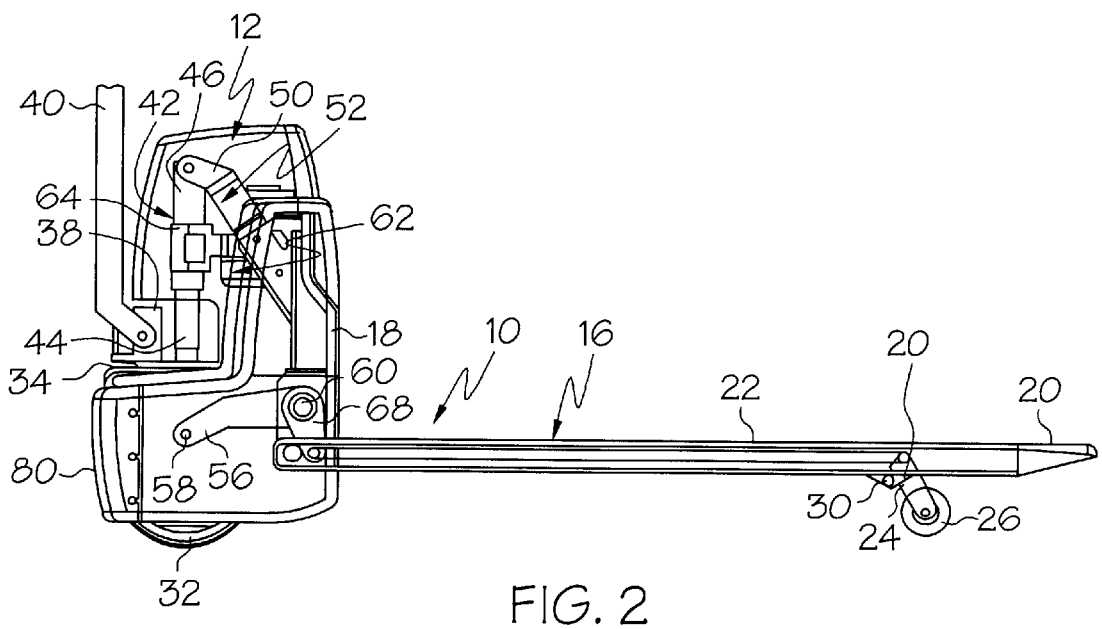
FIG. 2 shows the low-lift fork truck of FIG. 1 in the lifted position of the load-carrying part.

While this invention may be embodied in many different forms, there are described in detail herein a specific preferred embodiment of the invention. This description is an exemplification of the principles of the invention and is not intended to limit the invention to the particular embodiment illustrated.

The low-lift fork truck shown in FIGS. 1 to 4 has a load-carrying part 10 and a driving part 12. The load-carrying part 10 is composed of two spaced-apart wheel arms 14, 16 and a transverse member 18 interconnecting these two rigidly. The wheel arms have a tapered end portion 20 at the free end and housed inside their box-type profiled section is a forcing bar 22 which is hinged to a rocker 24 for a load-carrying roller 26 at the right end. The rocker, in turn, is hinged to the underside of the wheel arms 14, 16 via pillow blocks at 30. However, no detailed reference is made thereto here.

Disposed on the longitudinal axle in the driving part is a driving wheel 32 which is rotatably supported about a horizontal axis in a steering bolster 34. The steering bolster 34, in turn, is pivotally supported about a vertical axis. The bearing of the steering bolster is not illustrated in detail. The driving wheel 32 is driven by an electric motor wheel boss drive 36 to which detailed reference will not be made either.

Disposed on the upper surface of the steering bolster 34 is a trunnion 38 to which a drawbar 40 is hinged. The drawbar 40 makes it possible to pivot the steering bolster 34 and, hence, the driving wheel 32 for the purpose of steering the low-lift fork truck of FIGS. 1 to 4.

A lifting cylinder 42 including a piston rod 44 and a jacket 46 has its axis aligned towards the pivoting axis of the steering bolster 34. At this point, the piston rod 44 bears onto the steering bolster and the corresponding bearing for the steering bolster. Plates 48, 50 which are joined by a hinge to the jacket 46 are disposed on either side at the upper end of the jacket 46. The plates 48, 50 are firmly connected to the web of an approximately U-shaped bow 52 the legs of which obliquely extend downwardly and are connected in a slightly diverging manner to the transverse member 18 of the load-carrying part 10. The plates 48, 50 and the bow 52 constitute a rigid unit which defines the load-carrying part carrier. If the lifting cylinder 42 is actuated, i.e. moved out, it carries along the load-carrying part carrier, thus lifting the transverse member 18. The latter is guided over two levers 54, 56 serving as a handlebar. The levers 54, 56 are hinged to the frame of the driving part 12 at a point which is in a plane extending through the longitudinal axis of the lifting cylinder 42. This hinge point is designated 58. The point at which the lever 56 is hinged to the transverse member is designated 60. Each of the hinge points 60 is in the same plane, which is in a vertical line, in both the lowered and lifted position according to FIGS. 1 and 2. The hinge point 60 describes an arc therebetween the radius of curvature is determined by the length of the lever 56. This causes the load-carrying part 10 to tilt to a certain extent during a lift which, however, is completely negligible for the operation of the low-lift fork truck.

A motor-driven pump unit 62, which houses an electric motor, a pump, and a tank in a common casing, is connected to the jacket 46 of the lifting cylinder 42 by means of an appropriate fastening device. Therefore, the motor-driven pump unit 62 is moved along when the lifting cylinder 42 is actuated. However, the connection between this unit and the cylinder via flexible tubings or the like becomes superfluous here.

As can be seen the lifting power is introduced into the load-carrying part 10 substantially in the axis of the lifting cylinder 42 so that only minimum flexural moments will occur in the system. The lifting cylinder 42 may be designed to be relatively small. Therefore, the motor-driven pump unit may be dimensioned relatively small as well.

Another lever 68 is rigidly coupled to the levers 56 in the area of the hinge axis 60. It is hinged to the left-hand end of the forcing bar 22 and, therefore, if the lifting cylinder 42 lifts and, thus, the load-carrying part 10 lifts as well, causes the rocker 24 to pivot and, hence, the load-carrying roller 26 to move out of the wheel arm in order to be given a support at the free ends also after the wheel arms 14 are lifted.

For completeness, it should be noted here that reception spaces 70, 72 for battery components are provided on either side of the driving wheel 32 symmetrically to the longitudinal axle of the low-lift fork truck. The reception spaces 70, 72 are drawn to be very deep so that there is only a small distance from the contact surface and supporting rollers may be omitted. The supporting function, if required, is performed by the underside of the reception spaces 70, 72.

Finally, it should denoted that braces 74, 76 laterally engage the bow 52 to join the bow legs to lateral portions of the transverse member 18.

As can be seen the driving part 12 is designed in an extremely rugged manner. Formed on either side of the drawbar 40 is a relatively low shoulder which is interrupted by a column-like portion in which the lifting cylinder and the motor pump unit are accommodated.

Figure 3:
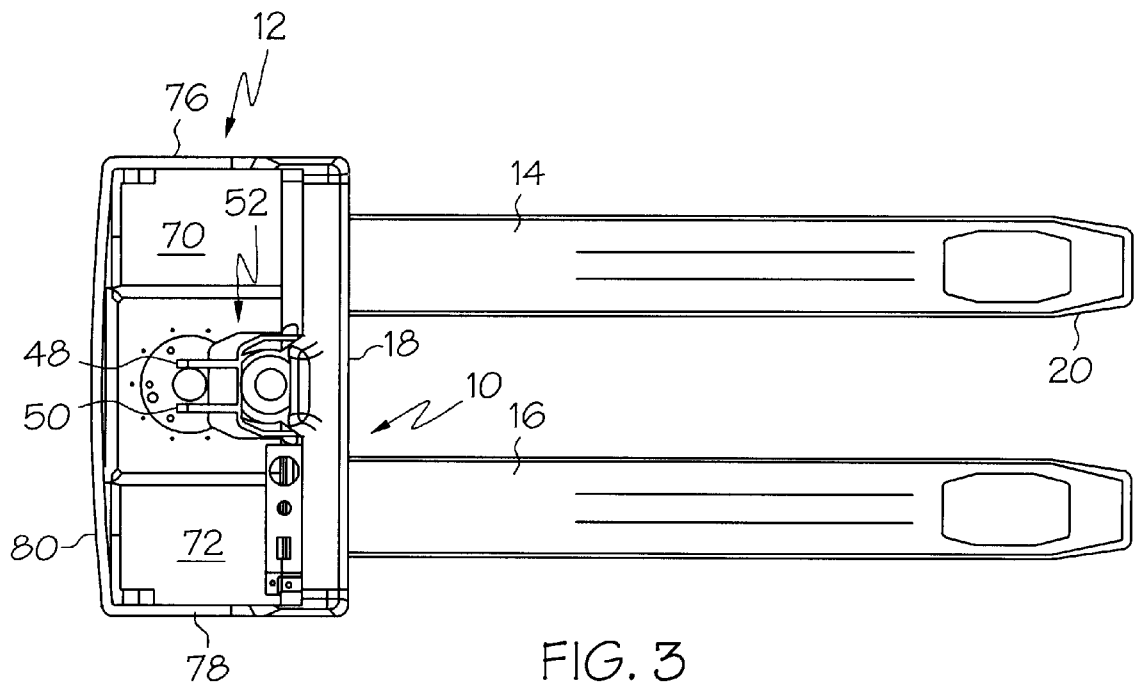
FIG. 3 shows a plan view of a portion of the low-lift fork truck of FIGS. 1 and 2.
Figure 4:
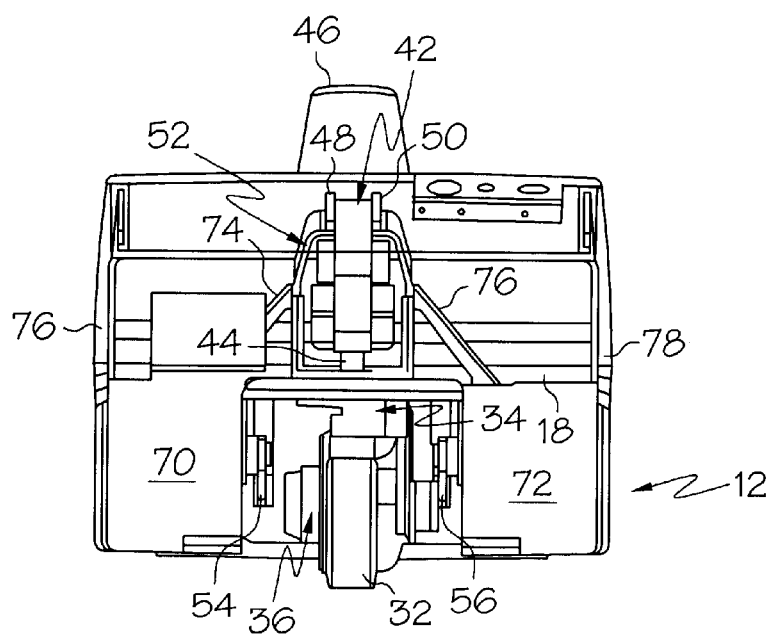
FIG. 4 shows a rear view of the low-lift fork truck of FIGS. 1 and 2.

In addition, it should be mentioned that the lateral shell as can be seen especially at 76 and 78 in FIG. 3 is drawn inwardly towards the wheel arms 14, 16, which protects the transverse member 18 against contact by an operator. A rear-sided shell 80 encloses the rear bottom portion of the casing and is bent over and under it at top and partly at bottom to complete the outer casing of the driving part 12.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A low-lift truck including a driving part and a load-carrying part the driving part comprising:

a frame;

a driving wheel disposed on a longitudinal axis of the truck;

a steering bolster supporting the driving wheel and supported for rotation in the frame about a vertical axis;

an electric motor coupled to the driving wheel and supported by the steering bolster;

a steering pole hinged to the steering bolster for steering the driving wheel;

a lifting cylinder having a piston rod and cylinder jacket for a piston, the lifting cylinder being supported through the piston rod on the steering bolster in a position approximately centric to the rotation axis thereof;

a motor-driven pump unit for the lifting cylinder firmly connected to the cylinder jacket;

the load-carrying part comprising:

two parallel-spaced wheel arms interconnected by a rigid transverse member adjacent to the driving part a load-carrying wheel at the end of each wheel arm, the wheel being supported by a rocker element which in turn is supported by the wheel arm to be pivoted about a horizontal axis in order to remain in contact with the ground when the wheel arms are lifted;

a forcing bar hinged to the rocker element at one end and to a linkage at the other end, the linkage being coupled to the transverse member such that the rocker element is pivoted by the forcing bar if the transverse member is lifted;

a rigid load-carrying part carrier (48, 50, 52) firmly connected to the transverse member (18) and hinged to the upper end of the cylinder jacket, the transverse element (18) being hinged to the frame of the driving part (12) through two parallel levers (54, 56) disposed below the lifting cylinder (42) for guidance of the load-carrying part (10) and actuation of the forcing bars (20) and further wherein the load-carrying part carrier is defined by an approximately U-shaped bow (52) the legs of which are connected to the transverse member (18) and the web of which is hinged to the lifting cylinder (42) through two parallel plates (48, 50).

2. The low-lift truck of claim 1, wherein the hinge points (60) of the levers (54, 56) to the transverse member are in a same common vertical plane in the lower and lifted positions of the load-carrying part (10).

3. The low-lift truck of claim 1, wherein the hinge points of the levers (54, 56) on the driving part (12) are in a plane which extends through the axis of the lifting cylinder (42).

4. The low-lift truck of claim 1, wherein the cylinder jacket and a common casing for the pump unit are formed integrally.

* * * * *